(12) United States Patent
Petersen et al.

(10) Patent No.: US 9,035,773 B2
(45) Date of Patent: May 19, 2015

(54) ENVIRONMENT MONITORING AND RECORDING TAG WITH REMOTE SENSING CAPABILITY

(75) Inventors: Michael Petersen, Ottawa (CA); Alan Wilson, Ottawa (CA); Dean Brotzel, Ottawa (CA)

(73) Assignee: ADVANCED ELECTRONIC TRACKING, Dayton, OH (US)

( * ) Notice: Subject to any disclaimer, the term of this patent is extended or adjusted under 35 U.S.C. 154(b) by 898 days.

(21) Appl. No.: 12/722,958

(22) Filed: Mar. 12, 2010

(65) Prior Publication Data

US 2010/0170352 A1     Jul. 8, 2010

(51) Int. Cl.
    G08B 13/14    (2006.01)
    G01D 21/00    (2006.01)
    G01D 9/00     (2006.01)
    G06K 19/07    (2006.01)

(52) U.S. Cl.
    CPC ............. G01D 21/00 (2013.01); G01D 9/005 (2013.01); G06K 19/0717 (2013.01)

(58) Field of Classification Search
    USPC .................. 340/10.1–10.6, 572.1–572.9; 235/375–385
    See application file for complete search history.

(56) References Cited

U.S. PATENT DOCUMENTS

| | | | | |
|---|---|---|---|---|
| 3,878,502 A | * | 4/1975 | Rochelle | 367/134 |
| 4,158,965 A | * | 6/1979 | Prosky | 374/164 |
| 4,679,332 A | * | 7/1987 | Luthi | 33/559 |
| 5,517,124 A | * | 5/1996 | Rhoades et al. | 324/662 |
| 5,627,523 A | * | 5/1997 | Besprozvanny et al. | 340/623 |
| 5,682,149 A | * | 10/1997 | Hofman | 340/870.17 |
| 6,054,935 A | * | 4/2000 | Urbas et al. | 340/870.17 |
| 6,486,776 B1 | * | 11/2002 | Pollack et al. | 340/521 |
| 6,543,279 B1 | * | 4/2003 | Yones et al. | 73/146.5 |
| 6,563,417 B1 | * | 5/2003 | Shaw | 340/10.1 |
| 6,700,224 B2 | * | 3/2004 | Biskup et al. | 307/116 |
| 6,817,757 B1 | * | 11/2004 | Wallace | 374/120 |
| 6,856,247 B1 | * | 2/2005 | Wallace | 340/539.16 |
| 6,917,291 B2 | * | 7/2005 | Allen | 340/572.1 |
| 6,937,647 B1 | * | 8/2005 | Boyd et al. | 375/228 |
| 6,985,757 B2 | * | 1/2006 | Liu et al. | 455/558 |
| 7,015,826 B1 | * | 3/2006 | Chan et al. | 340/870.17 |
| 7,019,638 B1 | * | 3/2006 | Wallace | 340/531 |
| 7,026,929 B1 | * | 4/2006 | Wallace | 340/539.13 |
| 7,060,970 B2 | * | 6/2006 | Cheung et al. | 250/238 |
| 7,072,789 B2 | * | 7/2006 | Vock et al. | 702/141 |
| 7,084,738 B2 | * | 8/2006 | Bastian, II | 340/5.92 |
| 7,257,107 B2 | * | 8/2007 | Swier et al. | 370/338 |
| 7,262,685 B2 | * | 8/2007 | Bastian, II | 340/5.92 |
| 7,271,674 B1 | * | 9/2007 | Butenhoff et al. | 331/183 |

(Continued)

FOREIGN PATENT DOCUMENTS

| | | | | |
|---|---|---|---|---|
| EP | 0511807 A1 | | 4/1992 | |
| JP | 10289297 A | * | 10/1998 | G06K 19/07 |

(Continued)

*Primary Examiner* — Paul Obiniyi
(74) *Attorney, Agent, or Firm* — R. William Graham

(57) ABSTRACT

A tag includes an integrated circuit thereon, including memory, antenna means for RF transmission of data acquired by the integrated circuit, a sensor sensing environmental conditions to which the sensor is subjected, the sensor providing signals based on the environmental conditions to the integrated circuit, a thermistor device of increasing the accuracy of the tag by confining on-board calculation data to a resistance domain and leaving conversion of the data to a temperature domain for an external device once the data is retrieved from the tag's memory.

5 Claims, 4 Drawing Sheets

(56) References Cited

U.S. PATENT DOCUMENTS

| | | | |
|---|---|---|---|
| 7,432,825 B2* | 10/2008 | Chan et al. | 340/870.17 |
| 7,437,585 B2* | 10/2008 | Nakano et al. | 713/330 |
| 7,564,353 B2* | 7/2009 | Stevens et al. | 340/572.1 |
| 7,577,261 B2* | 8/2009 | Liu et al. | 381/77 |
| 7,768,389 B2* | 8/2010 | Frank | 340/531 |
| 7,868,755 B2* | 1/2011 | Hanai et al. | 340/539.22 |
| 7,966,154 B2* | 6/2011 | Vock et al. | 702/188 |
| 2002/0174254 A1* | 11/2002 | Kita et al. | 709/250 |
| 2004/0032308 A1* | 2/2004 | Cheung et al. | 333/26 |
| 2004/0036626 A1* | 2/2004 | Chan et al. | 340/870.17 |
| 2004/0129863 A1* | 7/2004 | Cheung et al. | 250/214 C |
| 2004/0149736 A1* | 8/2004 | Clothier | 219/627 |
| 2004/0207512 A1* | 10/2004 | Bastian, II | 340/5.92 |
| 2005/0015536 A1* | 1/2005 | Lee | 710/313 |
| 2005/0030929 A1* | 2/2005 | Swier et al. | 370/338 |
| 2005/0140498 A1* | 6/2005 | Bastian | 340/5.92 |
| 2005/0247319 A1* | 11/2005 | Berger | 128/898 |
| 2006/0002461 A1* | 1/2006 | Boyd et al. | 375/228 |
| 2006/0026297 A1* | 2/2006 | Kung et al. | 709/239 |
| 2006/0174150 A1* | 8/2006 | Nakano et al. | 713/330 |
| 2006/0293977 A1* | 12/2006 | Stevens et al. | 705/28 |
| 2007/0120668 A1* | 5/2007 | Boyd et al. | 340/565 |
| 2007/0171201 A1* | 7/2007 | Pi et al. | 345/157 |
| 2007/0194913 A1* | 8/2007 | Yokoshima et al. | 340/539.26 |
| 2007/0229926 A1* | 10/2007 | Morisaki et al. | 358/527 |
| 2007/0255756 A1* | 11/2007 | Satomura et al. | 707/104.1 |
| 2007/0262850 A1* | 11/2007 | Willgert | 340/10.3 |
| 2008/0048855 A1* | 2/2008 | Berger | 340/539.12 |
| 2008/0065792 A1* | 3/2008 | Wu et al. | 710/16 |
| 2008/0139117 A1* | 6/2008 | Madine et al. | 455/41.2 |
| 2008/0141073 A1* | 6/2008 | Shih et al. | 714/36 |
| 2009/0003828 A1* | 1/2009 | So | 398/56 |
| 2009/0006675 A1* | 1/2009 | Rofougaran | 710/62 |
| 2009/0102655 A1* | 4/2009 | Yi et al. | 340/572.1 |
| 2009/0201529 A1* | 8/2009 | Takahara | 358/1.15 |
| 2009/0256684 A1* | 10/2009 | Fukuda | 340/10.3 |
| 2010/0027523 A1* | 2/2010 | Chan et al. | 370/345 |
| 2010/0052854 A1* | 3/2010 | Jeun | 340/5.85 |
| 2010/0248783 A1* | 9/2010 | Jolivet | 455/558 |

FOREIGN PATENT DOCUMENTS

| | | | | |
|---|---|---|---|---|
| JP | 11338739 A | * | 12/1999 | G06F 11/30 |
| JP | 2003123158 A | * | 4/2003 | G08B 17/00 |
| JP | 2006023963 A | * | 1/2006 | |
| WO | WO9407225 | | 3/1994 | |
| WO | WO 9953279 A1 | * | 10/1999 | G01K 7/01 |
| WO | WO0191080 | | 11/2001 | |

* cited by examiner

ENVIRONMENT MONITORING AND RECORDING TAG WITH REMOTE SENSING CAPABILITY

CROSS-REFERENCE TO RELATED APPLICATIONS

This application claims the benefit, under 35 U.S.C. 119(a), of Canadian Application No. 2,627,258 filed on Mar. 27, 2008, which is hereby incorporated by reference.

TECHNICAL FIELD

The present device relates to a reusable environment monitoring tag that can be attached to the exterior of or placed within a product, package, article or container to sense the internal environment of the package including but not limited to temperature, vibration, pressure, radiation, shock, light, position and atmosphere.

BACKGROUND

Devices to monitor temperature and other environmental variables affecting packaged goods during shipping or through the logistics chain are in widespread use. Most such devices are large, expensive and require the package to be opened to retrieve the environmental data from the device. Petersen and Wilson in Canadian Patent No. 2627258 have described a small low cost, disposable device (tag) for monitoring, recording and downloading the temperature history of the internal environment of a package in transit. Due to size and cost considerations the onboard computational power of such devices is limited. This has implications for their functionality.

In simple, disposable, low-cost temperature-monitoring devices on-board firmware typically converts sensor generated resistance values to temperature readings using the Hart-Steinhart approximation relating resistance to temperature for semiconductor thermistors. Due to the low computational power inherent in such low-cost tags, each conversion of a resistance value to a temperature value results in significant degradation of the tag's accuracy due to rounding errors. Current temperature monitoring devices convert thermistor-derived resistance values to temperature values in real time and either store the latter readings or display them directly as via an LCD. This results in compounding the rounding errors as a function of the number of conversions. Such devices are typically limited to accuracy of ±4° C.

A need has been identified for further refinements to such devices to increase the accuracy with which said device can monitor the environment, allow said device to communicate its environmental data history simply and without recourse to an external reader device and permit manual termination of said device's data acquisition function at any point during transit or in the logistics chain to save battery power or for other reasons. In addition, other needs include permitting automatic termination of said device's data acquisition function at any point during transit or in the logistics chain to save battery power or for other reasons, detecting unauthorized or surreptitious opening of the package during transit or in the logistics chain and permitting said device to operate in a food grade or pharmaceutical grade environment and to transmit its environmental history data without the package environment being disturbed as by opening. Further refinements include the ability to operate in environments whose temperatures are higher or lower than those at which most electronic battery powered devices fail or become unreliable (>100° C. or <−40 minus 40° C.) and broadcast by RF over greater range.

SUMMARY OF THE INVENTION

The present invention addresses the limitations of prior art and meets the criteria set forth herein. The invention contemplates a number of improvements to a low cost, disposable RF-enabled environment monitoring tag that can be attached to the exterior of or placed within a product, package, article or container to sense the internal environment of the package at programmed intervals, process and store the data, and subsequently communicate the environmental data history to an interested party by RF transmission. Environmental variables of interest include but are not limited to temperature, vibration, pressure, radiation, shock, light, position and atmospheric pressure.

In one embodiment the accuracy of such low cost disposable tags can be improved by increasing the efficiency of the tag's limited onboard data processing ability.

In the proposed invention a temperature monitoring tag uses an on-board thermistor to generate resistance signals. The tag does not have its own temperature display so there is no requirement to convert the resistance values to temperature values. All on-board calculations are done on resistance units, leaving the tag free of temperature considerations. Hart-Steinhart conversions to the temperature domain are done only after the resistance data have been downloaded by RF or other means to a PC or other device with significantly greater computational ability, thus allowing more precise rounding when converting the data to estimated temperature values. This procedure results in improvement in accuracy by a factor of 10 to ±0.2° C. or better.

A similar increase in accuracy can be achieved for any environmental sensor including but not limited to vibration, pressure, radiation, shock, light, position and atmospheric pressure sensor monitoring where the generated signal is in the resistance domain. Leaving such data in the resistance domain to be converted to the domain of interest by a more powerful computing device only after the resistance data have been downloaded will increase the accuracy of measurement of the environmental variable of interest.

In another embodiment of the proposed invention the tag communicates its environment data history to an interested party without recourse to an external reader or display device. In supply chain monitoring it may not be practical or cost-efficient to have RF, IR or contact readers at each decision point along the chain. However a field worker along the chain might have a requirement to know if the package contents are viable to determine where the package is to be directed. Said worker might not have access to an external reader or display device or might not be technology literate.

As proposed above a temperature monitoring tag may retain its data in the resistance domain until the end of the journey. According to pre-programmed instructions the tag can make a decision about the viability of the contents based solely on predetermined resistance data criteria. This decision can be communicated to a party of interest by a lighted LED or other means without conversion to the temperature or other environmental domain yielding increased accuracy of temperature monitoring without requiring an external reader device. An informed decision about the viability of the product can be made at a glance by a minimally trained observer in the field without recourse to an external reader device.

In another embodiment of the proposed invention it may be desirable to stop the tag's data acquisition process when the package reaches an interim or end destination. Reasons for doing this would include minimizing battery discharge and reducing uncertainty about the package's subsequent environment history.

This can be achieved manually in the field by pressing a contact on or within the tag's envelope that isolates the battery from the sensor monitoring circuit stopping data acquisition and battery discharge. The environment history data can then be retrieved from the tag's memory at a later time by an interested party using an RF, IR or contact reader.

In another embodiment of the proposed invention it may be desirable to stop the tag's data acquisition process automatically when the package reaches an interim or end destination without recourse to an external reader device. This might be desirable where the reliability or training of field users or other package handlers is suspect.

In such circumstances the tag can be equipped with a photosensitive transistor in Darlington configuration such that opening the package will expose the tag to light. This in turn will cause the environmental data acquisition circuit to be interrupted automatically without intervention by the recipient. As described above, the tag's data can then be retrieved at a later time by a party interested in the package's environment history using an RF, IR or contact reader.

In a further embodiment of the proposed invention it may be desirable to monitor a package and its contents for surreptitious or unauthorized opening. This might be for security reasons such as detecting tampering, theft of contents, or theft and replacement of contents with counterfeited substitutes.

As described above, the tag can be equipped with a photosensitive transistor in Darlington configuration such that opening the package will expose the tag to light. The time of the signal generated by the light exposure can be recorded by the tag's memory to be retrieved at a later time when it may be used to determine the location along the logistics chain where the unauthorised opening occurred. The signal can also be used to light a warning LED on the tag to trigger an alarm using the tag's RF transmitting ability.

In a further embodiment of the proposed invention a small, low-cost reusable environment monitoring tag can be attached to the exterior of or placed within a product, package, article or container to sense the internal environment of the package including but not limited to temperature, vibration, pressure, radiation, shock, light, position and atmospheric pressure. The invention further contemplates locating the environment monitoring sensor or sensors at the end of a probe and at a distance from the monitoring tag. The environmental data sensed by the sensor at the end of the probe are monitored, analyzed, stored and subsequently transmitted to an interested party by radio frequency (RF) or other means as described in prior art.

The proposed invention also permits the use of such tags in food grade and pharmaceutical grade environments by enclosing the tag and its probe in a continuous waterproof barrier of food grade plastic or other material separating the electronics and other components of the tag from the environment.

In use the present invention would allow the tag to sense the package environment remotely via a sensor-containing probe being inserted into the interior of the package and the tag being attached to the exterior of the package. This confers major advances to prior art, such as sensing package temperatures below those at which electronics typically fail or become unreliable as for package contents cooled by dry carbon dioxide ("dry ice") or other coolants ($<-40°$ C.), sensing temperatures above those at which electronics typically fail or become unreliable ($>100°$ C.) as for the contents of autoclaves, deep frying of foods (to $180°$ C.), steamer ovens (85 to $90°$ C. for extended periods), and related food processing applications, and placing the tag with its transmitting antenna on the outside of a package with only the probe penetrating the interior, reducing losses in the tag's RF signal due to passing through the package material. This increases the effective range of the tag's RF downloading ability and also makes possible the use of infrared (IR) as a data transmission medium.

An embodiment is accordingly directed to a reusable environment monitoring tag that can be attached to the exterior of or placed within a product, package, article or container to sense the internal environment of the package including but not limited to temperature, vibration, pressure, radiation, shock, light, position and atmosphere. the thermistor device is capable of generating resistance values including one of vibration, pressure, radiation, shock, light, position and atmospheric pressure.

The tag enables retrieval of the data via an external RF, IR or direct contact reader. The tag includes device for stopping manually the tag's environmental data acquisition at a predetermined interim or end point.

The tag includes a device for automatically stopping the data acquisition of the tag when sensing a predetermined condition has changed, such as exposure to light. The tag can include a conductor that allows a sensor to be placed at distance from the tag, wherein the tag and the sensor are encased in food or pharmaceutical grade heat shrink flexible plastic in a way that when heated under pressure the tag and the sensor form a single waterproof unit. The sensor is contained in a rigid stainless steel stylus.

The stylus has a proximal end of which is encased in food or pharmaceutical grade heat shrink plastic tubing extending proximally to an internal processor of the tag in such a way that when heat and pressure are applied the plastic tubing is sealed to form a single waterproof unit.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
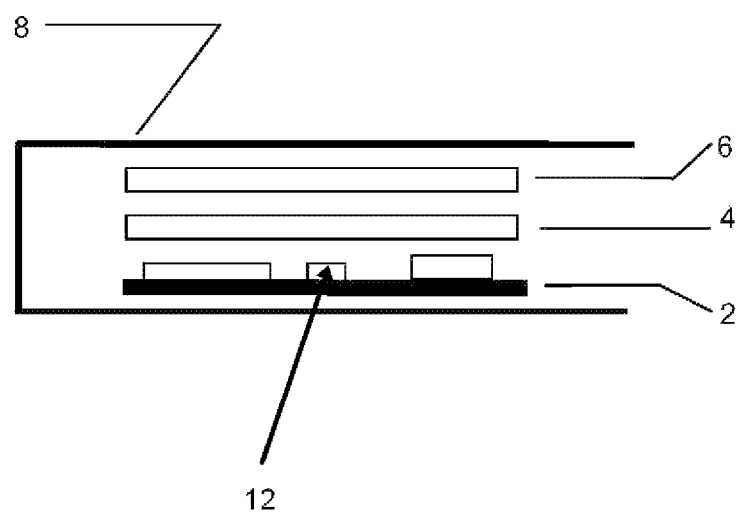
FIG. 1 shows a manner of encasing the tag in food or pharmaceutical grade plastic including the insertion of protective foam and an ESD safety layer to reduce static charge.

Referring to FIG. 1, an environment monitoring tag 2 comprising electronic components mounted on a substrate is covered by a layer of protective foam 4 over which is located an ESD layer 6 to reduce static buildup. The sandwich comprising tag 2, foam 4 and ESD layer 6 is inserted in a suitably-sized pouch or envelope 8 of food or pharmaceutical grade heat sealable flexible plastic. In one of its embodiments heat and pressure are applied to the perimeter of the sandwich sealing the elements into a waterproof unit.

In parallel to the claims hereinafter, the tag 2 includes an integrated circuit thereon, including memory, an antenna device for RF transmission of data acquired by the integrated circuit, a sensor 12 sensing environmental conditions to which the sensor 12 is subjected. The sensor 12 provides signals based on the environmental conditions to the integrated circuit. Sensor thermistor device 12 is provided for increasing the accuracy of the tag wherein the thermistor generates resistance signals and the tag 2 is configured not to convert the resistance values to temperature values and performs on-board calculations only in resistance units thereby confining on-board calculation data to a resistance domain and leaving conversion of the data to a temperature domain for an external device once the data is retrieved from memory of the tag 2.

The thermistor device 12 is capable of generating resistance values including one of vibration, pressure, radiation, shock, light, position and atmospheric pressure. The tag 2 enables retrieval of the data via an external RF, IR or direct contact reader. The tag 2 includes a device for stopping manually the tag's environmental data acquisition at a predetermined interim or end point. The tag 2 includes a device for automatically stopping the data acquisition of the tag when sensing a predetermined condition has changed. A conductor 16 is provided that allows a sensor to be placed at distance from the tag 2.

This unit can then be inserted into a package containing food or medication without concern for contamination and can monitor the environment within the package in the manner described by Petersen and Wilson in Canadian Patent No. 2627258. When polled by an RF field generated by an interested party the environmental data are transmitted through the walls of the container to an appropriate RF reader to be utilized in assessing the history of the environment.

Figure 2:
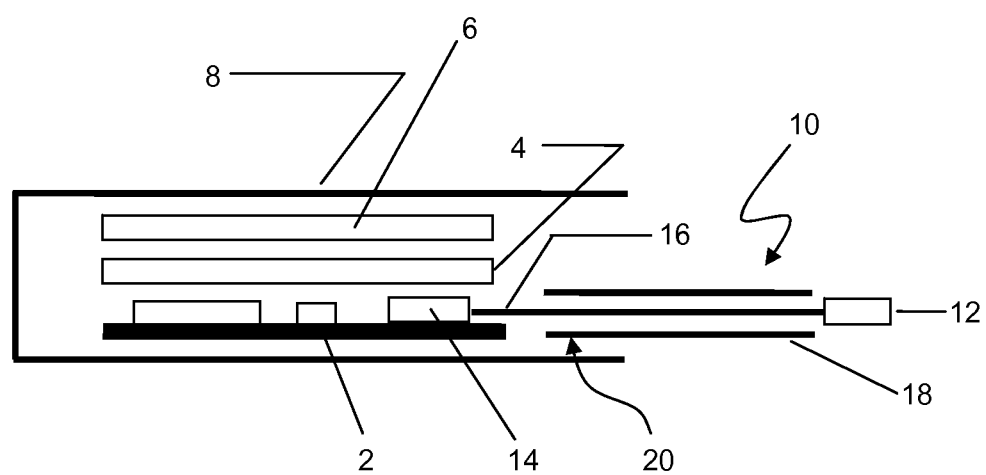
FIG. 2. shows in section the attachment to the tag of a remote sensing probe and its insulating materials before heat sealing.

In FIG. 2, an external probe 10 is shown connected to the tag prior to heat sealing. A sensor 12 is connected to the I/P terminals 14 of the tag 2 by a wire or other elongated conductor 16. As in FIG. 1, the tag 2 and its components are encased in an envelope 8 of food or pharmaceutical grade heat sealable flexible plastic. Thermistor sensor device 12 is for increasing the accuracy of the tag 2 by confining on-board calculation data to a resistance domain and leaving conversion of the data to a temperature domain for an external device once the data is retrieved from the tag's memory. In FIG. 2 the wire or other conductor 16 connecting the sensor 12 to the I/P terminals 14 of the tag 2 is encased in food or pharmaceutical grade heat shrink tubing 18. The tubing 18 is arranged so its proximal end 20 (nearest the tag) is overlapped by the tag's envelope 8 in a manner that when the tag 2 and probe 10 are subjected to heat and pressure the probe's plastic tube 18 will be hermetically sealed into the tag's envelope 8 forming a waterproof unit.

Figure 3:
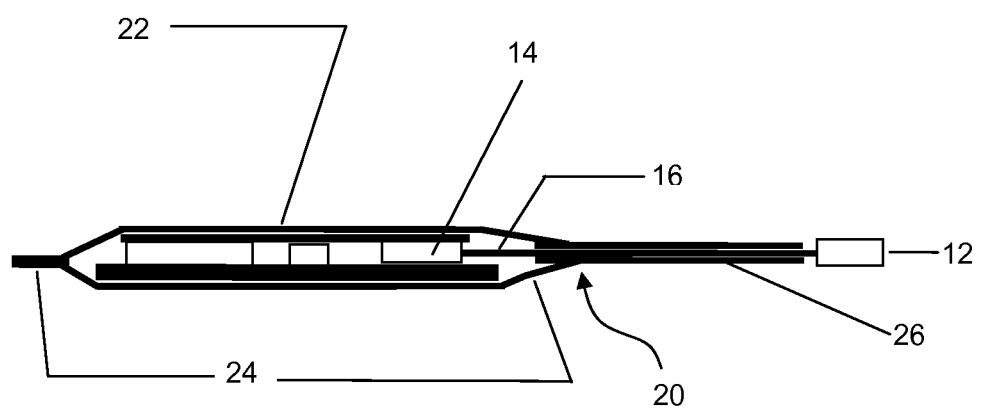
FIG. 3. shows a cross-sectional view of a tag and attached sensor probe after heat sealing.

FIG. 3 shows an external probe that has been heat sealed into a tag's envelope to form a waterproof unit. The heat sealed tag sandwich 22 is shown with a heat sealed pouch perimeter 24. The proximal end 20 of the probe's heat sealed shrink tube 26 is also shown hermetically sealed within the heat sealed tag sandwich 22.

Figure 4:
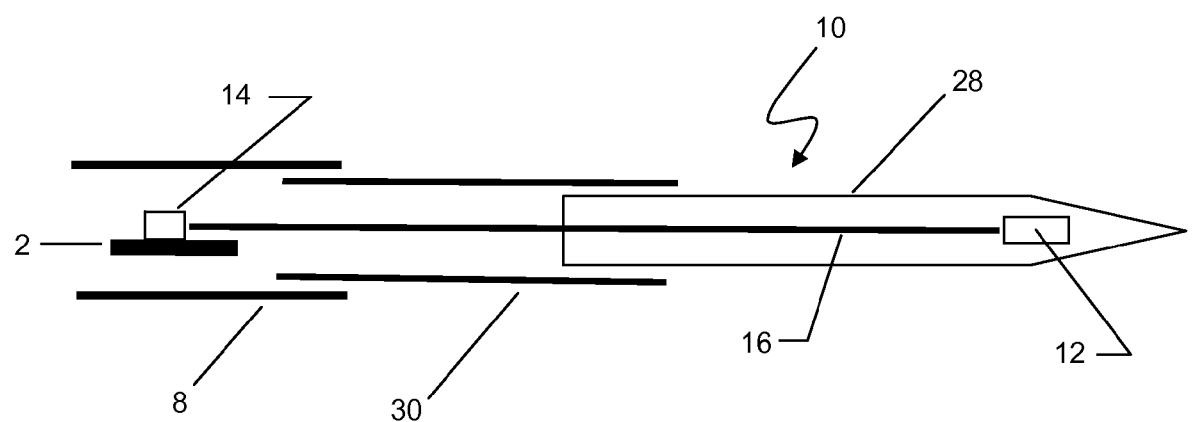
FIG. 4. shows the attachment of a remote sensing stainless steel probe to a tag before heat sealing.

In a further embodiment of the invention shown in FIG. 4 the sensor 12 and the conductor 16 attaching it to the I/P terminals 14 of the tag 2 are encased in a hollow stainless steel stylus 28 to facilitate penetration of the probe 10 through the walls of a container or into its contents. In this embodiment the proximal end of the stylus 28 is encased in heat shrink tubing 30 that extends proximally to be overlapped by the tag's envelope or pouch 8 as described for FIG. 2 above. When the tag 2 and probe 10 are subjected to heat and pressure the stainless steel stylus 28 is hermetically sealed into a waterproof unit with the tag in a similar manner to that described in FIG. 3.

While the present invention has been set forth above in a preferred embodiment, it is contemplated that other modifications, improvements and derivations will be readily apparent to those skilled in the art. Accordingly, the appended claims hereto should be accorded the full scope of protection of any such modifications, improvements and derivations.

What is claimed is:

1. A tag comprising an integrated circuit thereon, including memory, antenna means for RF transmission of data acquired by the integrated circuit, a sensor sensing environmental conditions to which said sensor is subjected, said sensor providing signals based on the environmental conditions to the integrated circuit, a thermistor device for increasing the accuracy of the tag wherein said thermistor generates resistance signals and said tag performs on-board calculations only in resistance units and does not convert the resistance values to temperature values thereby confining on-board calculation data to a resistance domain and leaving conversion of the data to a temperature domain for an external device once the data is retrieved from the tag's memory, wherein said thermistor device is connected to an elongated conductor only on one side which in turn connects to an I/P terminal of said tag in a manner to render said tag for generating resistance values including more than one of vibration, pressure, radiation, shock, light, position and atmospheric pressure; a device for stopping manually said tag's environmental data acquisition at a predetermined point, wherein said sensor is contained in a rigid stylus wherein said tag and said sensor are encased in food or pharmaceutical grade heat shrink flexible plastic in a way that when heated under pressure said tag and said sensor form a single waterproof unit.

2. The tag of claim 1, which enables retrieval of the data via an external RF, IR or direct contact reader.

3. A tag comprising an integrated circuit thereon, including memory, antenna means for RF transmission of data acquired by the integrated circuit, a sensor sensing environmental conditions to which said sensor is subjected, said sensor providing signals based on the environmental conditions to the integrated circuit, a thermistor device for increasing the accuracy of the tag, wherein said thermistor generates resistance signals and said tag performs on-board calculations only in resistance units and does not convert the resistance values to temperature values thereby confining on-board calculation data to a resistance domain and leaving conversion of the data to a temperature domain for an external device once the data is retrieved from said tag's memory, wherein said thermistor device is connected to an elongated conductor only on one side which in turn connects to an I/P terminal of said tag in a manner to render said tag for generating resistance values including more than one of vibration, pressure, radiation, shock, light, position and atmospheric pressure, a device for automatically stopping the data acquisition of said tag when sensing a predetermined condition has changed, wherein said sensor is contained in a rigid stainless steel stylus, wherein said tag and said sensor are encased in food or pharmaceutical grade heat shrink flexible plastic in a way that when heated under pressure said tag and said sensor form a single waterproof unit.

4. The tag of claim 1, which includes a conductor which is conductively interconnects an I/P terminal of said tag and said sensor to provide said sensor disposed a distance from said tag.

5. The tag of claim 1, wherein Said stylus is made of rigid stainless steel.

* * * * *